United States Patent
Chen et al.

(10) Patent No.: US 9,191,192 B2
(45) Date of Patent: *Nov. 17, 2015

(54) DIGITAL NRZI SIGNAL FOR SERIAL INTERCONNECT COMMUNICATIONS BETWEEN THE LINK LAYER AND PHYSICAL LAYER

(71) Applicant: INTEL CORPORATION, Santa Clara, CA (US)

(72) Inventors: Huimin Chen, Portland, OR (US); Chunyu Zhang, Folsom, CA (US); Paul S. Durley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/856,484

(22) Filed: Apr. 4, 2013

(65) Prior Publication Data

US 2013/0235913 A1  Sep. 12, 2013

Related U.S. Application Data

(63) Continuation of application No. 12/889,893, filed on Sep. 24, 2010, now Pat. No. 8,416,905.

(51) Int. Cl.
  *H04B 1/38* (2015.01)
  *H04L 7/033* (2006.01)
  (Continued)

(52) U.S. Cl.
  CPC ............ *H04L 7/033* (2013.01); *H04L 25/4904* (2013.01); *H04L 7/0004* (2013.01); *H04L 7/0331* (2013.01)

(58) Field of Classification Search
  CPC ... H04L 7/033; H04L 7/0004; H04L 27/2601; H04L 1/0025; H04L 1/0003; H04L 1/0071; H04L 5/0007; H04L 1/0009; H04L 27/0008; H04B 1/40; H04B 3/23; H04B 1/403
  USPC ............ 375/219, 295, 316; 370/419; 710/313
  See application file for complete search history.

(56) References Cited

U.S. PATENT DOCUMENTS 5,121,487 A  6/1992  Bechtolsheim
5,557,634 A  9/1996  Balasubramanian et al.
(Continued)

FOREIGN PATENT DOCUMENTS

WO  96/12364 A1  4/1996
WO  2012/040717 A2  3/2012
WO  2012/040717 A3  7/2012

OTHER PUBLICATIONS

Office Action received for U.S. Appl. No. 12/889,893, mailed on Jul. 19, 2012, 11 pages.
(Continued)

*Primary Examiner* — Zewdu Kassa
(74) *Attorney, Agent, or Firm* — Jordan IP Law, LLC

(57) ABSTRACT

Systems and methods of operating a serial interconnect interface provide for generating a pulse in response to a state change in a data signal of the serial interface interconnect, and transmitting the pulse from a physical layer of the serial interconnect interface to a link layer of the serial interconnect interface. The duration of the pulse can be selected based on whether the state change corresponds to an end of packet (EOP) condition. In addition, the data signal may include a non return to zero invert (NRZI) encoded signal, wherein the pulse is part of a digital NRZI signal.

20 Claims, 3 Drawing Sheets

(51) Int. Cl.
*H04L 25/49* (2006.01)
*H04L 7/00* (2006.01)

(56) References Cited

U.S. PATENT DOCUMENTS

| | | | |
|---|---|---|---|
| 5,602,873 | A | 2/1997 | Balasubramanian et al. |
| 6,108,726 | A | 8/2000 | Runaldue et al. |
| 6,870,855 | B2 | 3/2005 | Fujimori et al. |
| 6,977,960 | B2 | 12/2005 | Takinosawa |
| 7,324,619 | B2 | 1/2008 | Tsai et al. |
| 7,343,500 | B2 | 3/2008 | Igari |
| 7,356,047 | B1 | 4/2008 | Mahalawat et al. |
| 7,466,668 | B2 | 12/2008 | Dove |
| 7,657,692 | B2 | 2/2010 | Lee et al. |
| 7,673,075 | B1 | 3/2010 | Masiewicz |
| 7,698,589 | B2 | 4/2010 | Huang |
| 7,761,645 | B2 | 7/2010 | Monks et al. |
| 7,904,623 | B2 | 3/2011 | Simmons et al. |
| 8,018,924 | B1 | 9/2011 | Medina et al. |
| 8,028,095 | B1 | 9/2011 | Lo et al. |
| 8,166,221 | B2 | 4/2012 | Lee et al. |
| 8,200,870 | B2 | 6/2012 | Nemazie et al. |
| 8,214,678 | B2 | 7/2012 | Abe |
| 2002/0178291 | A1 | 11/2002 | Senthil et al. |
| 2003/0179709 | A1 | 9/2003 | Huff |
| 2004/0114622 | A1 | 6/2004 | Nation et al. |
| 2005/0169300 | A1 | 8/2005 | Liu et al. |
| 2005/0235089 | A1* | 10/2005 | Cheng et al. ............... 710/305 |
| 2005/0268010 | A1 | 12/2005 | Igari |
| 2007/0079045 | A1* | 4/2007 | Luke ............... 710/313 |
| 2007/0165663 | A1 | 7/2007 | Aloni et al. |
| 2008/0082736 | A1* | 4/2008 | Chow et al. ............... 711/103 |
| 2008/0235418 | A1* | 9/2008 | Werthen et al. ............... 710/106 |
| 2008/0320202 | A1 | 12/2008 | Monks et al. |
| 2009/0046741 | A1 | 2/2009 | Duan et al. |
| 2009/0237174 | A1 | 9/2009 | Morita |
| 2010/0011128 | A1 | 1/2010 | Paycher et al. |
| 2010/0169045 | A1 | 7/2010 | Shin et al. |
| 2010/0313059 | A1* | 12/2010 | Wang et al. ............... 713/502 |
| 2011/0204946 | A1 | 8/2011 | Shori |
| 2012/0082166 | A1 | 4/2012 | Sala et al. |

OTHER PUBLICATIONS

Notice of Allowance received for U.S. Appl. No. 12/889,893, mailed on Dec. 10, 2012, 8 pages.

International Search Report and Written Opinion received for PCT Application No. PCT/US2011/053291, mailed on May 3, 2012, 10 pages.

International Preliminary Report on Patentability and Written Opinion received for PCT Application No. PCT/US2011/053291, issued on Mar. 26, 2013, 6 pages.

* cited by examiner

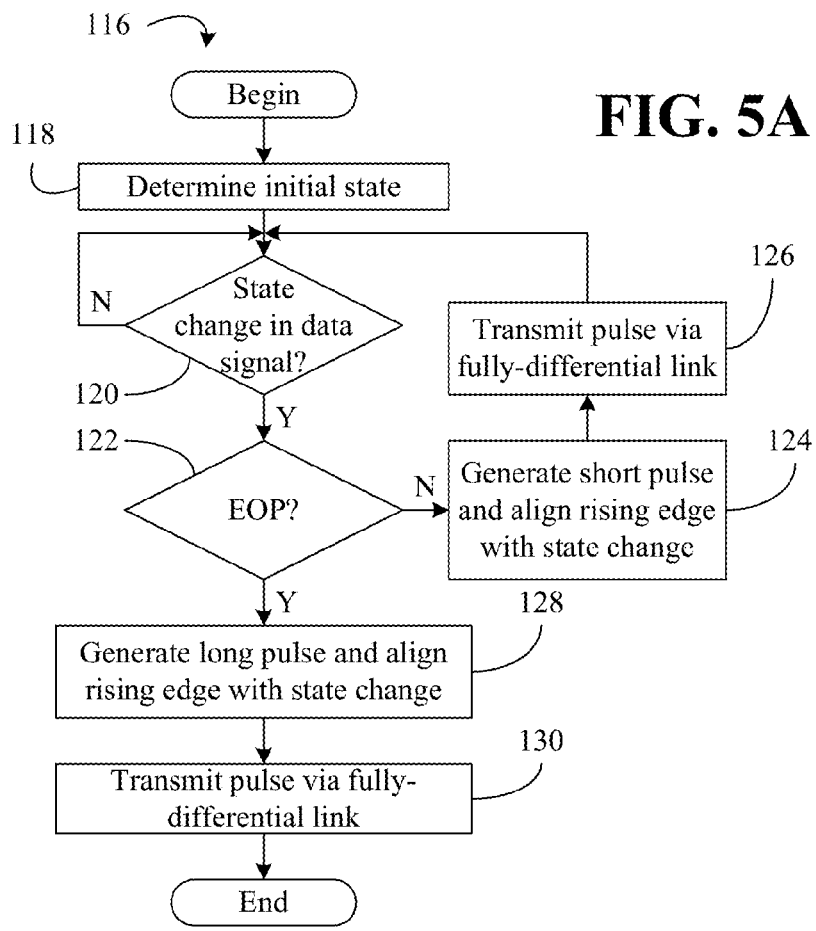

DIGITAL NRZI SIGNAL FOR SERIAL INTERCONNECT COMMUNICATIONS BETWEEN THE LINK LAYER AND PHYSICAL LAYER

RELATED APPLICATION

The present application is a continuation of U.S. patent application Ser. No. 12/889,893, filed on Sep. 24, 2010, entitled "DIGITAL NRZI SIGNAL FOR SERIAL INTERCONNECT COMMUNICATIONS BETWEEN THE LINK LAYER AND PHYSICAL LAYER".

BACKGROUND

1. Technical Field

Embodiments generally relate to serial interconnect communications. More particularly, embodiments relate to the use of digital non return to zero invert (NRZI) signals in serial communications between a physical layer and a link layer, for various information exchanges not limited to data.

2. Discussion

Serial interconnect IOs (input/output interfaces) such as USB (Universal Serial Bus, e.g., USB Specification, Rev. 2.0, Apr. 27, 2000, USB 3.0 Specification, Rev. 1.0, Nov. 12, 2008, etc.) IOs can be used to connect computing systems to a wide variety of devices such as digital cameras, keyboards and mice. Indeed, a typical computing system might include multiple integrated USB ports, which can enable devices to communicate with the computing system through the host controller. The USB physical layer (PHY) and the link layer can either be on the same piece of silicon or be on separate silicon chips. In case of the PHY and the link being on different chips, the link layer can be integrated with the processor, which benefits from lower voltage design technologies. Information packets may be passed between the PHY and link layer via an interface port. Current architectures for USB packet communications between the PHY and link layer include a parallel bus, which can have a relatively high pin count. If multiple USB ports need to be supported, the cost of pin count increase could become too high for an SoC implementation to accept.

BRIEF DESCRIPTION OF THE DRAWINGS

The various advantages of the embodiments of the present invention will become apparent to one skilled in the art by reading the following specification and appended claims, and by referencing the following drawings, in which:

FIG. 5A is a flowchart of an example of a method of generating pulses according to an embodiment; and FIG. 5B is a flowchart of an example of a method of reconstructing a data signal according to an embodiment.

DETAILED DESCRIPTION

Embodiments may provide for an apparatus including a converter to generate a pulse in response to a state change in a data signal of a serial interconnect interface. The apparatus can also include a transmitter to transmit the pulse from a physical layer of the serial interconnect interface to a link layer of the serial interconnect interface.

Embodiments may also include a system having a processor and a serial interconnect interface coupled to the processor. The serial interconnect interface can include a converter to generate a pulse in response to a state change in a data signal of the serial interconnect interface, and a transmitter to transmit the pulse from a physical layer of the serial interconnect interface to a link layer of the serial interconnect interface.

Other embodiments can include a method in which a state change is detected in a data signal of a Universal Serial Bus (USB) interface, wherein the data signal includes a non return to zero invert (NRZI) encoded signal. The method may also provide for triggering a counter and an un-calibrated ring oscillator in response to the state change, wherein triggering the un-calibrated ring oscillator starts a pulse. The duration of the pulse can be controlled based on a value of the counter, and a rising edge of the pulse may be aligned with the state change in the data signal. The method may also provide for transmitting the pulse from a physical layer of the USB interface to a link layer of the USB interface.

Figure 1:
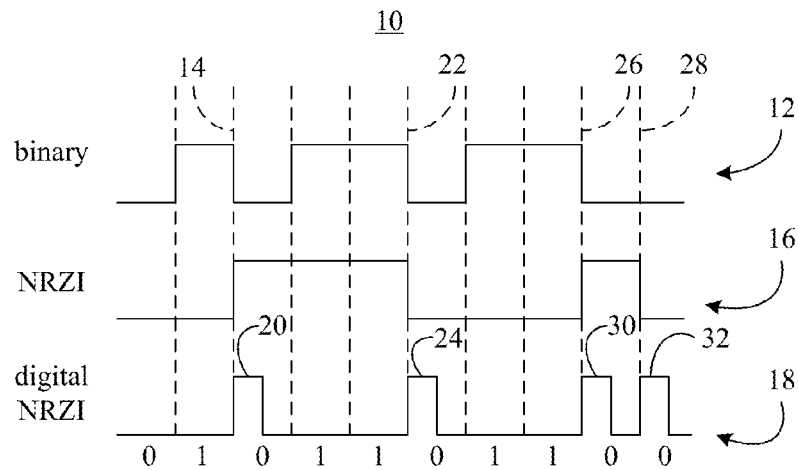
FIG. 1 is a timing diagram of an example of a digital NRZI signal according to an embodiment.

Turning now to FIG. 1, a timing diagram 10 is shown in which data represented in a binary signal 12 is transferred from a transmitting entity to a receiving entity via a serial interconnect. Thus, the transfer might occur from a host controller to a device or from a device to a host controller, wherein both the transmitting and receiving entities can include a physical layer (PHY) that interfaces with a physical transmission medium, such as a four-wire cable (e.g., $V_{BUS}$, D+, D−, GND) in the case of a USB serial interconnect architecture, connecting the two entities. In the illustrated example, the binary signal 12 is encoded as a non return to zero invert (NRZI) signal 16 for transmission across the physical medium, wherein standard NRZI encoding is defined to have a transition when the bit is zero (e.g., low) and no transition when the bit is one (e.g., high). Each entity may also include a link layer coupled to the PHY, wherein the link layer processes data at the packet level and the NRZI signal 16 may be converted into a digital NRZI signal 18 prior to transmission between the PHY and link layers. As will be discussed in greater detail, transmitting the digital NRZI signal 18 between the PHY and link layers can provide a number of advantages including, but not limited to, more accurate representation of NRZI timing, easier handling of switching noise, fewer components, and smaller form factors.

In particular, at time instance 14, the illustrated binary signal transitions from high to low, which causes a corresponding state change in the NRZI signal 16. Upon detection of the state change in the NRZI signal 16, the PHY interface to the link layer can generate a pulse 20 in the digital NRZI signal 18, align the rising edge of the pulse 20 with the state change in the NRZI signal 16, and transmit the pulse 20 to the link layer. At instance 22, the binary signal again transitions from high to low, causing a corresponding state change in the NRZI signal 16, and another pulse 24 in the digital NRZI signal 18. Instances 26, 28 of the binary signal taking on the low value, result in pulses 30, 32, respectively, in the digital NRZI signal 16.

Figure 2:
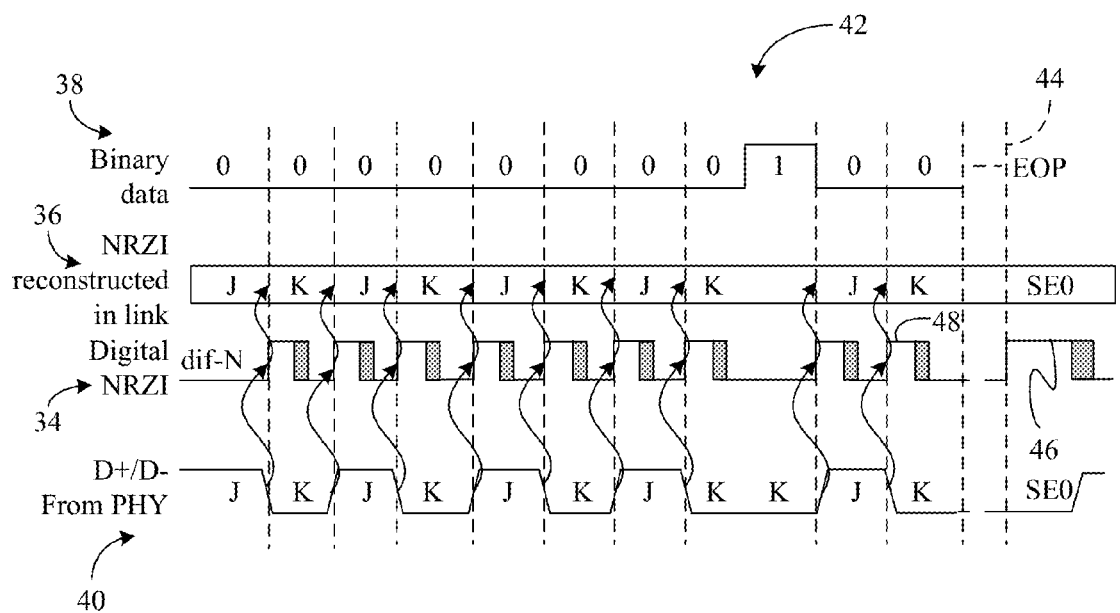
FIG. 2 is a timing diagram of an example of a recovered NRZI signal according to an embodiment.

FIG. 2 demonstrates that as the link layer receives a digital NRZI signal 34 from the PHY, it may reconstruct a corresponding NRZI signal 36 in order to recover the underlying packet data. In the illustrated example, a string of zeroes in a binary data signal 38 leads to a series of "J-K" state changes in a transmitted NRZI signal 40 and corresponding pulses in the digital NRZI signal 34. In response to receiving the pulses, the link layer can cause a corresponding state change in the reconstructed NRZI signal 36. Because the initial state ("J" in the illustrated example) of the PHY and link layers is known, the underlying data may be recovered accurately and consistently. At the illustrated region 42, the binary data signal 38 transitions to the high value, which leads to the transmitted NRZI signal 40 remaining in the "K" state and no pulse being generated in the digital NRZI signal 34. Accordingly, the reconstructed NRZI signal 36 in the link layer can also remain in the "K" state.

Generally, the duration of the pulses in the digital NRZI signal 34 can be selected based on whether the state change in the transmitted NRZI signal 40 corresponds to an end of packet (EOP) condition. For example, at illustrated instance 44, a single ended zero (SE0) condition is generated in the transmitted NRZI signal 40 due to an EOP condition in the underlying binary data signal 38. In one example, the SE0 condition is generated by driving both data lines of a differential-ended serial bus (e.g., D+/D−) low for two bit times relative to the speed of transmission, followed by a J state change for one bit time. In response to detecting the SE0 condition, the receiving PHY can generate a pulse 46 in the digital NRZI signal 34, wherein the pulse 46 has a longer duration than non-EOP related pulses such as pulse 48. Alternatively, longer durations could be used for non-EOP related pulses and shorter durations could be used for EOP related pulses.

In the illustrated example, the specific duration of the pulses 46, 48 need not be exact (e.g., substantial pulse width variation is permitted), as long as their relative durations/ratio exceeds a certain threshold. Since a high level of precision is not required to generate and/or distinguish between the pulses 46, 48, fewer, smaller and lower-cost timing components may be used to implement the digital NRZI signal 34. In particular, an un-calibrated ring oscillator might be used rather than a calibrated oscillator to generate the pulses. In addition, the digital NRZI signal 34 may be transmitted between the PHY and link layers via a fully-differential link because single-ended signaling is not needed to identify EOP conditions, wherein a fully-differential link can be particularly advantageous with regard to minimizing component count and reducing form factors due to easier handling of switching noise.

Figure 3:
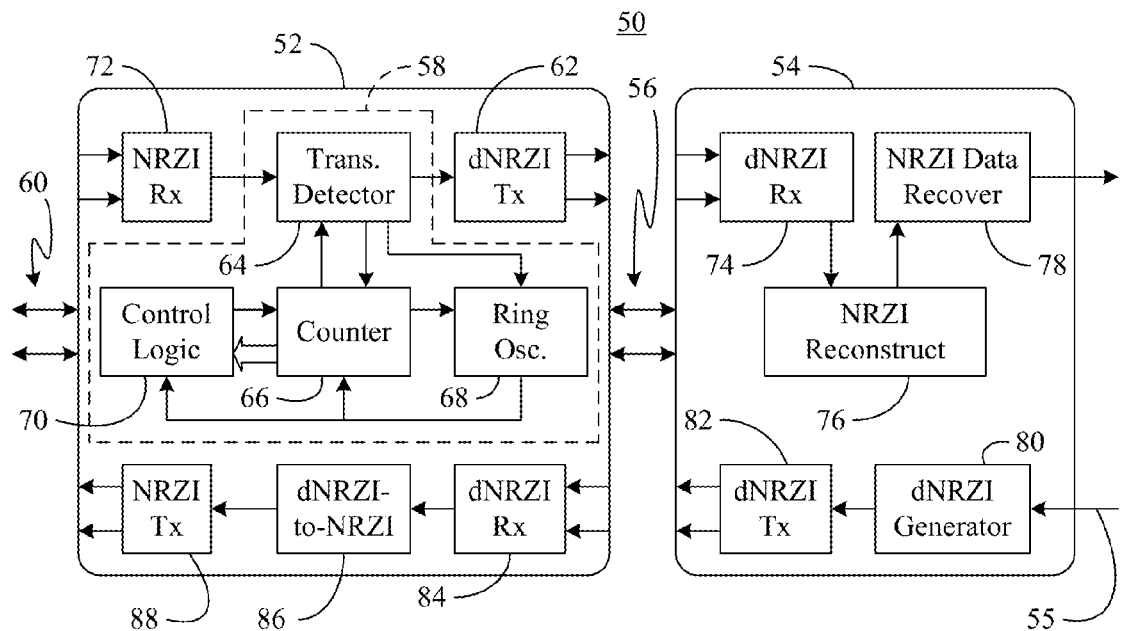
FIG. 3 is a block diagram of an example of a serial link PHY interface (SLPI) according to an embodiment.

Turning now to FIG. 3, a portion of a serial interconnect (e.g., bus) interface 50 is shown. In the illustrated example, a physical layer (PHY) 52 is coupled to a link layer 54 via a fully-differential link 56 so that single ended signaling between the PHY 52 and the link layer may be eliminated. In general, the PHY 52 may include a receiver 72 to receive a data signal from data lines of a differential-ended serial bus (e.g., interconnect) 60, a converter 58 that generates pulses in response to state changes in the data signal, and a transmitter 62 to transmit the pulses from the PHY 52 to the link layer 54 via the fully-differential link 56.

The data signal may be a non return to zero invert (NRZI) encoded signal, wherein the pulses are part of a digital NRZI ("dNRZI") signal. In the illustrated example, the converter 58 has a transition detector 64 to detect the state changes in the NRZI signal and generate triggers based on the state changes, wherein a counter 66 begins counting in response to the triggers and a ring oscillator 68 starts the pulses in response to the triggers. As already noted, the ring oscillator 68 may be an un-calibrated ring oscillator 68 that has a relatively low cost and real estate requirement. In addition, control logic 70 can be used to control the duration of each pulse based on the value of the counter 66. Thus, if the value of the counter 66 indicates that an end of packet (EOP) condition has been encountered (e.g., the state change causes the value to exceed a preset threshold), then the control logic 70 can establish a relatively long duration for the pulse in the digital NRZI signal. Otherwise, the control logic 70 may establish a relatively short duration for the pulse in the digital NRZI signal. Upon receipt of the digital NRZI signal at the link layer 54 by a receiver 74, reconstruction logic 76 may be used to reconstruct the NRZI signal, wherein a recovery module 78 can be used to recover the packet data in the reconstructed NRZI signal.

The illustrated link layer 54 also includes a dNRZI generator 80 to generate a dNRZI signal based on link layer packet data 55 and a transmitter 82 to transmit the dNRZI signal to the PHY via the fully-differential link 56. Thus, the transmitted dNRZI signal may include pulses of a relatively short duration to indicate the occurrence of state changes and pulses of a relatively long duration to indicate EOP conditions. The PHY 52 can include a receiver 84 to receive the dNRZI signal, and a converter 86 to convert the dNRZI signal to an NRZI signal. Thus, the converter 86 might include functionality similar to that of the reconstruction logic 76 in the link layer 54. The illustrated PHY 52 also includes a transmitter 88 to transmit the converted NRZI signal over the serial bus 60.

Figure 4:
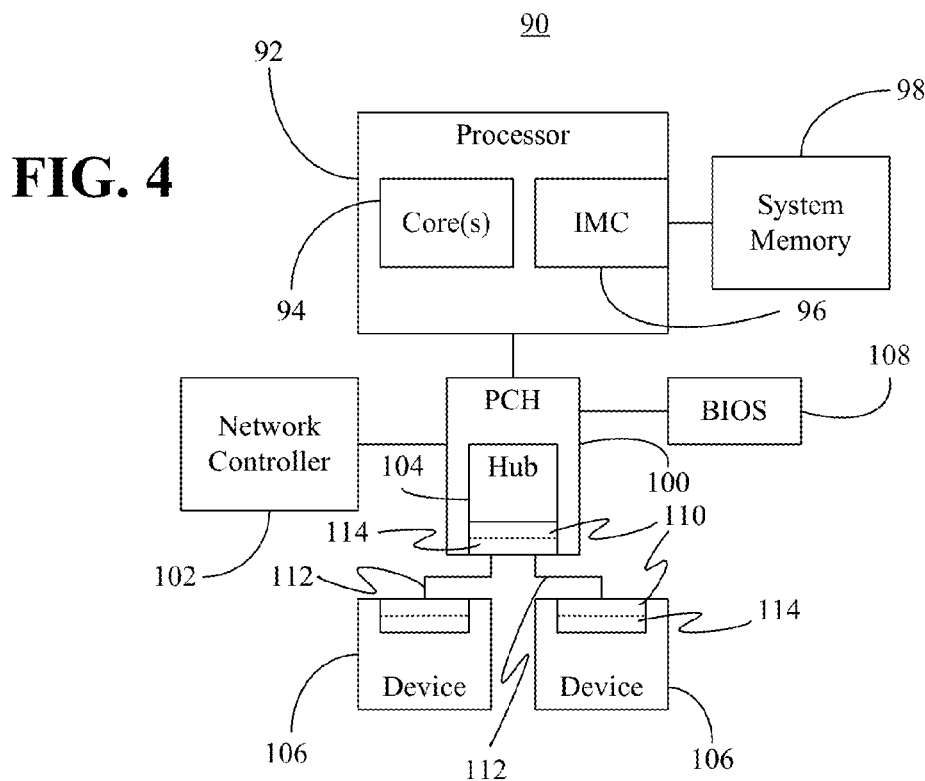
FIG. 4 is a block diagram of an example of a system according to an embodiment.

FIG. 4 shows a computing system 90. The system 90 could be part of a mobile device such as a laptop, personal digital assistant (PDA), mobile Internet device (MID), wireless smart phone, media player, imaging device, etc., or any combination thereof. The system 90 could alternatively include a fixed platform such as a desktop personal computer (PC) or a server. In the illustrated example, a processor 92 includes one or more cores 94 and an integrated memory controller (IMC) 96, which provides access to system memory 98. The system memory 98 could include dual data rate (DDR) synchronous dynamic random access memory (SDRAM, e.g., DDR3 SDRAM JEDEC Standard JESD79-3C, April 2008) modules. The modules of the system memory 98 may be incorporated into a single inline memory module (SIMM), dual inline memory module (DIMM), small outline DIMM (SODIMM), and so on. The processor 92 may also execute one or more drivers and an operating system (OS) such as a Microsoft Windows, Linux, or Mac (Macintosh) OS.

The illustrated processor 92 communicates with a platform controller hub (PCH) 100, also known as a Southbridge, via a bus. The IMC 96/processor 92 and the PCH 100 are sometimes referred to as a chipset. The processor 92 may also be operatively connected to a network (not shown) through the PCH 100 and a network controller 102. Thus, the network controller 102 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The PCH 100 may also have internal controllers such as a serial interconnect interface 104 (e.g., USB), a Serial ATA (SATA, e.g., SATA Rev. 3.0 Specification, May 27, 2009, SATA International Organization/SATA-IO) controller (not shown), a High Definition Audio controller (not shown), etc. The illustrated serial interconnect interface 104 may be coupled to one or more devices 106, which can include FS (full speed, e.g., 12 MHz) and LS (low speed, e.g., 1.5 MHz) user interface (UI) devices (e.g., joystick, keyboard, mouse, etc.) that enable a user to interact with and perceive information from the system 90. The PCH 100 may also be coupled to storage, which can include a hard drive (not shown), read only memory (ROM), optical disk, BIOS (basic input/output system) memory 108, flash memory (not shown), etc.

As already noted, the serial interconnect interface 104 and devices 106 can include a physical layer (PHY) 110 coupled to a serial interconnect 112. The serial interconnect interface 104 and devices 106 may also include a link layer 114, wherein the layers 110, 114 can include functionality similar to that of layers 52, 54, respectively, already discussed. Thus, each PHY 110 can include a converter to generate pulses in response to state changes in a data signal and a transmitter to transmit the pulses from the PHY 110 to the link layer 114.

Turning now to FIG. 5A, a method 116 of converting a data signal such as an NRZI encoded signal into a digital data signal is shown. The method 116 may be implemented in fixed-functionality hardware using circuit technology such as application specific integrated circuit (ASIC), complementary metal oxide semiconductor (CMOS) or transistor-transistor logic (TTL) technology, in executable firmware as a set of logic instructions stored in a machine- or computer-readable medium of a memory such as random access memory (RAM), read only memory (ROM), programmable ROM (PROM), flash memory, etc., or any combination thereof.

Processing block 118 provides for determining an initial state of a physical layer and a link layer of a serial interconnect interface. If it is determined at block 120 that a state change has occurred in a received data signal, illustrated block 122 provides for determining whether the state change corresponds to an end of packet (EOP) condition. As already noted, one approach to the determination at block 122 is to identify whether the state change has a single ended zero signature that might include both data lines of a differential-ended serial bus (e.g., D+/D−) being driven low for two bit times relative to the speed of transmission, followed by a J state change for one bit time. If an EOP condition is not detected, a relatively short pulse may generated and aligned with the state change at block 124, wherein block 126 provides for transmitting the pulse to the link layer via a fully-differential link. If it is determined at block 122 that the state change does correspond to an EOP condition, illustrated block 128 provides for generating a relatively long pulse and aligning its rising edge with the state change in the data signal. As already noted, one approach to generating the pulses can include triggering a counter and an un-calibrated ring oscillator in response to the state change, wherein triggering the un-calibrated ring oscillator starts the pulse, and controlling the duration of the pulse based on the value of the counter. The pulse may be transmitted to the link layer at block 130.

FIG. 5B shows a method 132 of reconstructing a data signal such as an NRZI encoded data signal from a digital data signal. In the illustrated example, an initial state of a serial interconnect interface physical layer and link layer is determined at block 134. If a pulse is detected in a digital data signal at block 136, a determination may be made at block 138 as to whether the pulse is a relatively long or relatively short pulse. If the pulse is not a long pulse, illustrated block 140 provides for generating a state change in the reconstructed data signal. Otherwise, an EOP may be signaled to the link layer at block 142.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A method comprising:
   determining an initial state of a data signal received in a serial interconnect interface;
   detecting a state change in the received data signal;
   generating triggers based on the state change, wherein a counter begins counting in response to the triggers and an un-calibrated ring oscillator starts a pulse in response to the triggers;
   determining whether the detected state change in the data signal corresponds to an end of packet (EOP) condition;
   generating the pulse of a length dependent upon the determination of the EOP condition;

aligning the generated pulse with the state change of the data signal; and transmitting the pulse from a physical layer of the USB interface to a link layer of the USB interface.

2. The method of claim 1, wherein determining whether the detected state change corresponds to an EOP condition includes identifying whether the state change has a single ended zero signature.

3. The method of claim 2, wherein the single ended zero signature includes both data lines of a differential ended serial bus being driven low for two bit times relative to the speed of transmission, followed by a state change for one bit time.

4. The method of claim 1, wherein the generated pulse length is short if the EOP condition is not detected.

5. The method of claim 1, wherein the generated pulse length is long if the EOP condition is detected.

6. The method of claim 1, wherein the received data signal includes a non return to zero invert (NRZI) encoded signal.

7. An apparatus comprising:
a converter to generate a pulse in response to an end of packet (EOP) condition of a data signal in a serial interconnect interface, wherein a transition detector of the converter detects a state change in the data signal and generates triggers based on the state change, a counter of the converter begins counting in response to the triggers and an un-calibrated ring oscillator of the converter starts the pulse in response to the triggers; and
a transmitter to transmit the pulse from a physical layer of the serial interconnect interface to a link layer of the serial interconnect interface.

8. The apparatus of claim 7, wherein the converter includes control logic to detect the end of packet condition by identifying whether the state change of the data signal has a single ended zero signature.

9. The apparatus of claim 7, wherein the converter includes control logic to control a length of the pulse based on the end of packet condition.

10. The apparatus of claim 8, wherein the single ended zero signature includes both data lines of differential ended serial bus being driven low for two bit times relative to the speed of transmission, followed by a state change for one bit time.

11. The apparatus of claim 9, wherein the control logic selects a short length for the generated pulse if a state change of the data signal does not correspond to an end of packet and selects a long length for the generated pulse if a state change of the data signal does correspond to an end of packet condition.

12. The apparatus of claim 7, wherein the transmitter is to align a rising edge of the pulse with a state change of the data signal.

13. The apparatus of claim 7, wherein the serial interconnect interface includes a Universal Serial Bus (USB) interface and the digital signal is to include a non return to zero invert (NRZI) encoded signal.

14. A system comprising:
a processor; and
a serial interconnect interface coupled to the processor, the serial interconnect interface including,
a converter to generate a pulse in response to an end of packet (EOP) condition of a data signal in a serial interconnect interface, wherein a transition detector of the converter detects a state change in the data signal and generates triggers based on the state change, a counter of the converter begins counting in response to the triggers and an un-calibrated ring oscillator of the converter starts the pulse in response to the triggers; and
a transmitter to transmit the pulse from a physical layer of the serial interconnect interface to a link layer of the serial interconnect interface.

15. The system of claim 14, wherein the converter includes control logic to detect the end of packet condition by identifying whether the state change of the data signal has a single ended zero signature.

16. The system of claim 14, wherein the converter includes control logic to control a length of the pulse based on the end of packet condition.

17. The system of claim 15, wherein the single ended zero signature includes both data lines of a differential ended serial bus being driven low for two bit times relative to the speed of transmission, followed by a state change for one bit time.

18. The system of claim 16, wherein the control logic selects a short length for the generated pulse if a state change of the data signal does not correspond to an end of packet and selects a long length for the generated pulse if a state change of the data signal does correspond to an end of packet condition.

19. The system of claim 14, wherein the transmitter is to align a rising edge of the pulse with a state change of the data signal.

20. The system of claim 14, wherein the serial interconnect interface includes a Universal Serial Bus (USB) interface and the digital signal is to include a non return to zero invert (NRZI) encoded signal.

* * * * *